Patented Dec. 5, 1933

1,938,170

UNITED STATES PATENT OFFICE 1,938,170

MANUFACTURE OF POROUS STRUCTURES

Harry T. Bellamy, Belvidere, Ill.

No Drawing. Application March 15, 1930
Serial No. 436,254

9 Claims. (Cl. 25—156)

The present invention relates to the formation of porous brick, tile and the like of earthy materials, for various purposes such as insulation from heat and cold, structural uses, and others. Porosity in brick, tile and the like increases the insulation properties, makes a less dense mass, and therefore a lighter weight structure. In producing porosity in such structures volatile ingredients such as naphthalene have been employed in comminuted form in admixture with the earthy materials and water, the mass dried in the required shapes, and then treated to volatilize the naphthalene, it being understood that a part or all of the naphthalene may also be removed during the drying process. When naphthalene is employed the volatilization may be completely effected below the boiling point of the water, and a current of hot air may be employed to remove water vapor and naphthalene vapor, keeping the temperature below the melting point of the naphthalene (about 80° C.) so that the latter remains solid and sustains the structure against collapse until sufficiently set by removal of water. Thereafter the dried mass is fired.

Porosity has also been produced in unfired earthy masses by using soluble ingredients that are dried into the mass and then extracted prior to firing by suitable solvents, or by suitable processes which effect removal (see U. S. patent to Walter No. 1,344,324).

In using the above processes certain commercial difficulties have been encountered. When naphthalene is used, the making of a standard (2½ pound) brick requires about four pounds of naphthalene. The removal of such a large amount of naphthalene is very slow, but not at all impossible.

When the porosity-forming agent is removed the dried brick is so porous and such a good heat insulator that it is quite difficult economically to fire the brick. In consequence, the inside of the mass is not readily heated for firing. The heat penetration is slow and the uneven heating of the mass has a tendency to cause cracks or to weaken the structure if initial heating is rapid. This is most pronounced in the larger masses.

The present invention aims to overcome the disadvantages above set forth and yet to retain the benefits derived from use of materials that are removable prior to firing.

One object of the invention is the use of solid combustible organic material, relatively non-volatile, as a substitute for a portion of the removable or volatile ingredient.

A more particular object is the use of wood particles such as sawdust or wood flour in admixture with material like naphthalene as a porosity forming agent.

Another object is the formation of a porous unfired mass containing combustible matter as an agent to form more pores on firing.

Various other objects and advantages of the invention will become apparent from the following description of the invention, showing one manner in which it may be carried out.

In order to make a porous mass or brick, a proper earthy material such as clay is mixed with water and some non-volatile organic matter and suitable volatile or other removable matter. The non-volatile and the removable pore forming ingredients by their size and shape will determine the character of the pores to be formed. It will be understood that the pores are of two classes, one, those which are formed in the unfired mass, and then fired in, and two, those which are formed and fired in during the firing process. The wet mass is shaped and dried under conditions which remove water and the removable ingredients, leaving a dried porous unfired mass, containing combustible solids as a pore-forming ingredient. On firing, the pores in the dried mass permit the access of air to burn the combustible matter, and the combustion generates heat to aid in firing the brick at the interior thereof. The pores of the unfired mass also provide exits for the products of decomposition and combustion of the organic material. This minimizes the danger of the exit gases rupturing the structure of the mass. Furthermore, the presence of the solid combustible matter in the dried mass strengthens the mass in handling before and during the early stages of firing.

The clays which may be employed may be chosen with reference to the kind of brick desired as is well known in the art. Special earth materials may be added for reasons which will appear hereinafter with reference to other ingredients.

The combustible material may be chosen from a wide variety of substances, may be waste products, such as sawdust, wood flour, ground wood, fibers, or other substances which contain a large amount of organic matter that will remain in the mass during the drying process.

The removable ingredient may be one which is readily volatile at low temperature, or one that may be removed before, during, or after drying. Naphthalene or paradichlorobenzene in crystal form may be employed, or used in other solid and comminuted forms, each having the advantage that they volatilize from a solid form at temperatures which also permit volatilizing water from the mass. Less volatile ingredients may be used which can be removed after the brick is substantially dry. Sulphur particles may also be used, and these volatilized from the dried brick. All the ingredients herein mentioned may be removed from the mass by extraction with suitable solvents, leaving a porous unfired brick containing combustible matter.

As an example of carrying out the invention the following composition is given:

|  | Per cent |
|---|---|
| Clay | 43.5 |
| Kieselguhr | 4.5 |
| Sawdust | 16.0 |
| Naphthalene | 36.0 |

Sufficient water to render plastic.

The plastic mass is shaped into a brick or tile, placed in a current of hot gases, preferably below the melting of naphthalene, until the latter and the uncombined water is removed to form the dry unfired mass, which is porous. The dried mass is then fired in the usual way, permitting access of air to effect combustion of the sawdust. The resulting product has a density of 0.69, equivalent to two and one half pounds in a standard brick.

In the above formula the naphthalene employed may be crude, containing certain oil impurities. The kieselguhr acts to absorb and retain the oil impurities, permitting volatilization from the brick of a high grade naphthalene product. The impurities are burned on firing.

The invention therefore comprises the formation of a porous dried brick containing an agent capable of forming more pores on firing and capable of combustion on firing. The solid combustible agent in the unfired brick strengthens the same. The pores in the dried brick permit access of air to the combustible matter, and egress of the decomposition or combustion products from the dried mass in the heating or firing process. By substituting solid combustible matter for a portion of the removable pore-forming ingredient, a considerable saving is effected in time for removal and in materials to be removed or to be employed in removal, and in the end equal porosity is obtained as if no substitution were made.

It will be understood that the invention is not limited to the exact composition herein disclosed, but is to be more broadly construed in accordance with the scope of the invention as expressed in the appended claims.

I claim:

1. The method of forming porous masses which comprises shaping a plastic earthy mixture containing a solid combustible non-volatile ingredient and a volatile ingredient as pore-forming agents, removing the volatile ingredient and water from the shaped mass, firing the resulting porous mass, and simultaneously burning out the combustible matter.

2. The method of forming porous masses which comprises shaping a plastic earthy mixture containing a solid combustible non-volatile ingredient and a removable ingredient as pore-forming agents, removing the removable ingredient and water to form a porous dried unfired mass, firing the resulting porous mass, and simultaneously burning out the combustible matter.

3. The method of forming porous masses which comprises shaping a plastic earthy mixture containing a solid combustible non-volatile ingredient and naphthalene as pore-forming agents, removing the naphthalene and water from the mass, firing the resulting porous mass, and simultaneously burning out the combustible matter.

4. The method of making porous masses which comprises shaping a plastic mass of clay, water, wood particles and naphthalene, volatilizing the water and naphthalene from the shaped mass, firing the dried mass, and simultaneously burning out the wood particles.

5. A composition for forming porous fired masses including clay, sawdust, naphthalene and water.

6. A composition for forming porous fired masses including clay, solid combustible non-volatile particles, solid particles of matter removable from the mass prior to firing, and water.

7. A composition for forming porous fired masses including clay, solid combustible particles, solid volatile particles capable of volatilization prior to firing, and water.

8. The method of making porous fired masses which comprises shaping an unfired mass of earthy materials containing combustible solids and removable solids in comminuted form, removing the removable solids while retaining the combustible solids, firing the resulting mass, and simultaneously burning out said solids.

9. A composition for firing to form porous masses, said composition comprising dried unfired clay containing pores resulting from the evolution of solid volatile particles, said clay also having embedded therein solid combustible particles.

HARRY T. BELLAMY.